United States Patent [19]
Miyamoto et al.

[11] Patent Number: 5,368,678
[45] Date of Patent: Nov. 29, 1994

[54] TREAD PICKUP DEVICE

[75] Inventors: Yoshinori Miyamoto; Hidemasa Sato; Jiro Agawa, all of Nagasaki; Keizo Yamashita, Hiratsuka; Kazuo Mogi, Hiratsuka; Toru Aihara, Hiratsuka, all of Japan

[73] Assignees: Mitsubishi Jukogyo Kabushiki Kaisha; The Yokohama Rubber Co., Ltd., both of Tokyo, Japan; a part interest

[21] Appl. No.: 87,399

[22] Filed: Jul. 8, 1993

[30] Foreign Application Priority Data

Jul. 10, 1992 [JP] Japan .................. 4-183845

[51] Int. Cl.$^5$ ............................ B29D 30/30
[52] U.S. Cl. ................ 156/405.1; 156/584; 414/796.9; 414/793.4
[58] Field of Search .......... 156/405.1, 540, 584; 414/794.3, 793.4, 793.8, 796.9; 271/85, 106, 42, 128; 198/468.2

[56] References Cited

U.S. PATENT DOCUMENTS

| | | | |
|---|---|---|---|
| 3,095,193 | 6/1963 | Sorenson | 271/42 |
| 4,055,258 | 10/1977 | Schneider | 414/796.9 |
| 4,055,261 | 10/1977 | Schneider | 414/793.8 |
| 4,247,093 | 1/1981 | Kistner et al. | 271/3.1 |
| 5,102,293 | 4/1992 | Schneider | 414/796.9 |

FOREIGN PATENT DOCUMENTS 2846006 4/1980 Germany .
737069 9/1955 United Kingdom .

OTHER PUBLICATIONS

Patent Abstracts of Japan, vol. 8, No. 80 (M-189) (1517), Apr. 12, 1984.

Primary Examiner—Geoffrey L. Knable
Attorney, Agent, or Firm—Jacobson, Price, Holman & Stern

[57] ABSTRACT

The present invention aims to provide a tread pickup device which can pick up a tread on a truck reliably without manpower. The device comprises a plurality of short first forks for scooping up a front edge of the tread placed on the truck and holding the tread, long second forks which are arranged adjacent to the first forks and inserted throughout the total width of the tread, and a mechanism for raising and moving the first and second forks together with the tread.

7 Claims, 3 Drawing Sheets

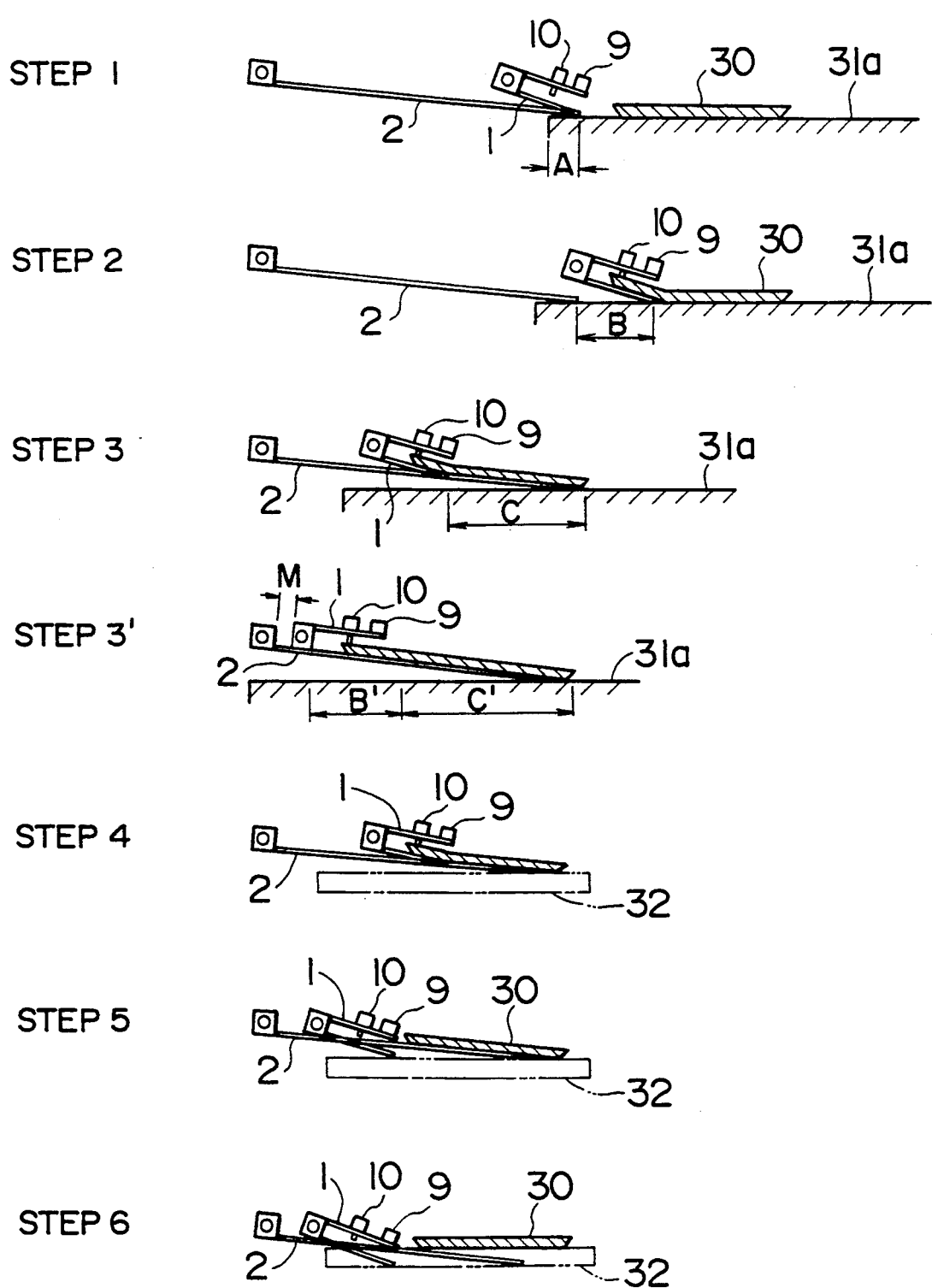

TREAD PICKUP DEVICE

FIELD OF THE INVENTION AND RELATED ART STATEMENT

The present invention relates to a tread pickup device on a tire-building machine.

For the prior art tread pickup device, treads, which have been cut into a length of one tire, are put side by side on a truck and carried to a tire-forming machine. The wrapping of treads around the tire-forming machine is automatically performed by means of a tread servicer as shown in Japanese Patent Laid-Open No. 218818/1991, but the supply of treads from the truck to the tread servicer is performed manually.

The conventional tread pickup operation is disadvantageous in the security of manpower and operation cost. In addition, there has been a need for mechanizing all operations including the supply of material to the tire-forming machine. For these reasons, the mechanization of tread pickup operation has been needed.

However, there are the following problems to be solved in mechanizing the tread pickup operation.

(1) The tread sometimes has a groove for letting air escape on its back surface. Therefore, a vacuum pad or other absorbing means cannot be used to lift the tread.

(2) The external surface of the tread sometimes sticks firmly to the truck. Therefore, a method for stripping it off effectively is needed.

OBJECT AND SUMMARY OF THE INVENTION

Accordingly, an object of the present invention is to provide a tread pickup device which can pick up a tread on a truck reliably without manpower.

To achieve the above object, the tread pickup device of the present invention is constructed in such a manner that (1) short first forks for being inserted under the front edge of a tread placed on a truck are installed so as to advance and withdraw with respect to the tread, (2) long second forks adjacent to the first forks are installed so as to advance and withdraw with respect to the tread, and (3) the first and second forks can be raised and lowered as a unit.

The operation of the tread pickup device in accordance with the present invention is as follows:

(1) The front edge of the tread is stripped off the plate of the truck by inserting the first forks slantwise under the front edge of the tread.

(2) The tread is stripped off the plate of the truck throughout the total width of the tread by inserting the second forks throughout the total width of the tread at the side of the first forks while the front edge of the tread is held by the first forks and the clamps.

(3) The tread is raised by the second forks.

BRIEF DESCRIPTION OF THE DRAWINGS

In the drawings,

FIG. 4 is a view showing the operation steps of the tread pickup device shown in FIGS. 1 through 3.

DETAILED DESCRIPTION OF PREFERRED EMBODIMENTS

An embodiment of the present invention will be described with reference to FIGS. 1 through 3.

Figure 1:
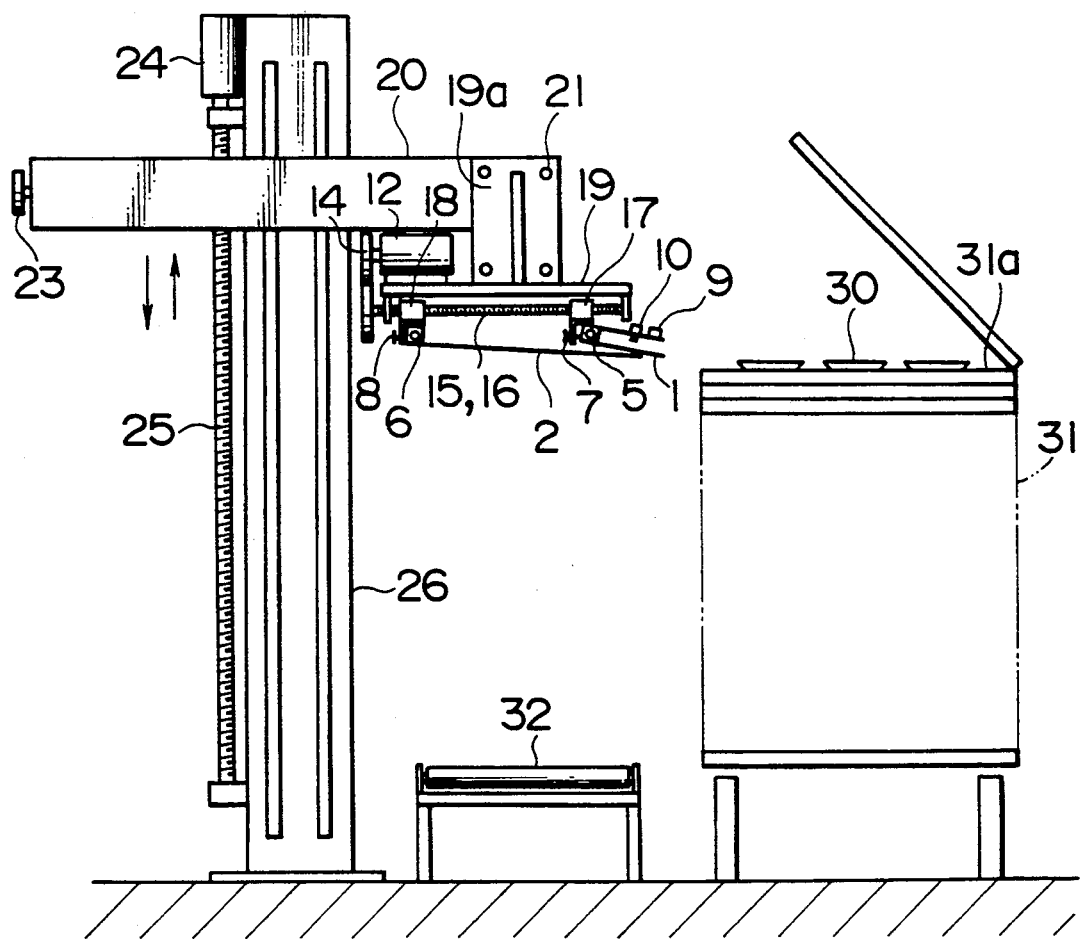
FIG. 1 is a side view showing the general arrangement of the tread pickup device of the present invention and its peripheral equipment.
Figure 2A:
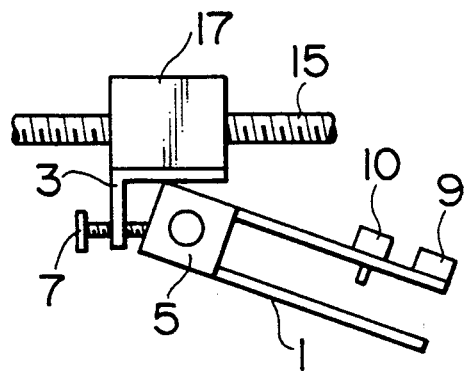
FIG. 2(A) is an expanded view of a first fork adjusting means.
Figure 2B:
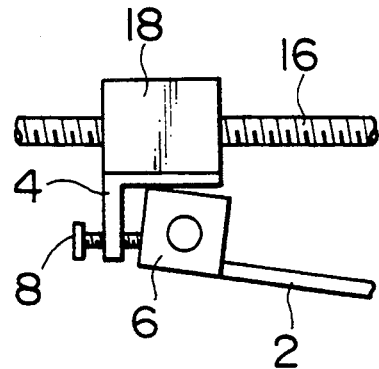
FIG. 2(B) is an expanded view of a second fork adjusting means.
Figure 3:
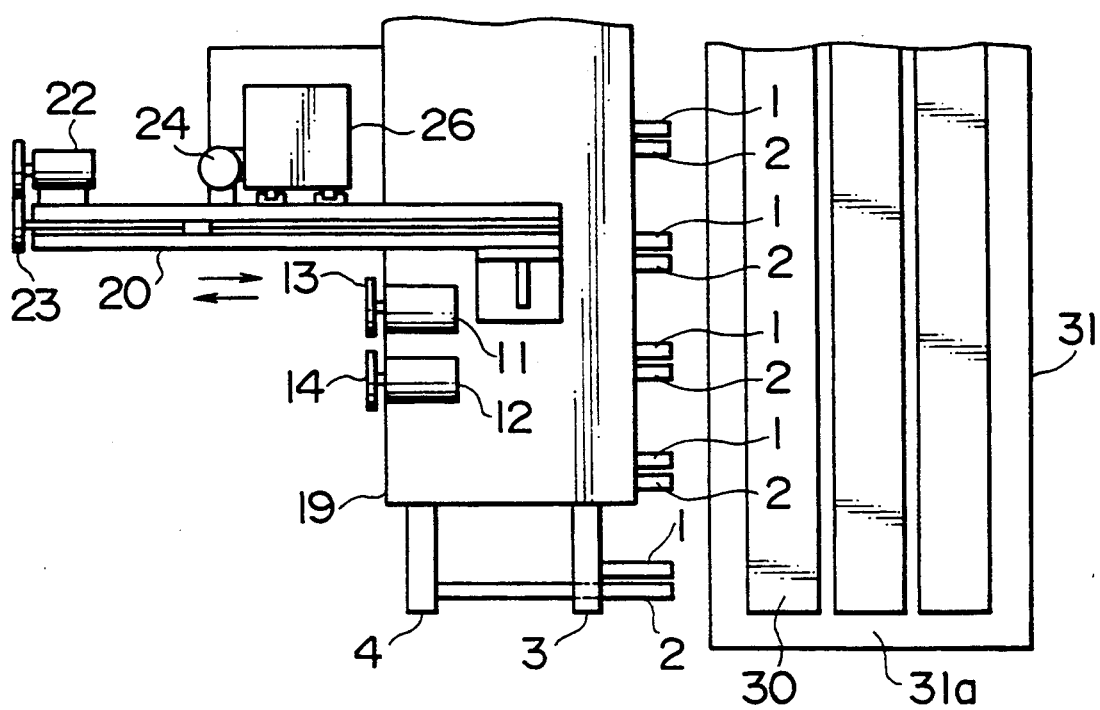
FIG. 3 is a plan view of FIG. 1.

FIGS. 1 and 3 are a side view and a plan view, respectively, showing the general arrangement of the tread pickup device of the present invention, a truck, and a carry-out conveyor. FIG. 4 is a view showing the operation steps of the tread pickup device shown in FIGS. 1 and 3.

For a device for automatically opening the carry truck 31, a device for centering the tread 30 transferred to the carry-out conveyor 32 and for automatically mounting it to a tread servicer (not shown), etc., the conventional devices can be used.

A first fork 1 and a second fork 2 are paired with each other and a plurality of pairs are positioned in the width direction of the tread 30 at intervals of, for example, 300 mm or 400 mm. The first fork 1 and the second fork 2 of a pair are rotatably attached to bars 3 and 4 via pins 5 and 6, respectively. The downward position of the first and second forks is adjusted by stoppers 7 and 8, respectively. The term "fork" used throughout this specification refers to a single prong member.

At the tip end of the first fork 1, a sensor 9 for detecting the front edge of the tread 30 and a clamp 10 for holding the tread 30 are provided. The sensor 9 is not needed for each of all first forks, but it may be installed on one typical first fork. The bars 3 and 4 are moved longitudinally via motors 11 and 12, gears 13 and 14, threaded bars 15 and 16, and nuts 17 and 18, respectively. The motors 11 and 12, the threaded bars 15 and 16, etc. are mounted to a head plate 19. The head plate 19 is installed to a head arm 20 with bolts 21 via a member 19a in such a manner that it can be aligned. The head plate 19 is longitudinally moved by means of a motor 22 via a gear 23 and a threaded bar, and vertically moved by means of a motor 24 along an upright 26 via a threaded bar 25.

An encoder (not shown) is connected to each of the motors 11, 12, 22, and 24 so that the position can be program controlled. The position of the uppermost plate 31a of the truck 31 is detected and controlled by a publicly known sensor (not shown).

Next, the operation steps of this device will be described with reference to FIG. 4.

Step 1: The tips of the first fork 1 and the second fork 2 are brought into contact with the plate 31a of the truck in such a manner that they fit with each other at distance A from the end of the plate 31a (a position in the area where the tread is normally absent) by detecting the plate 31a by the sensor 9.

Step 2: Only the first fork 1 advances. The sensor 9 detects the end of the tread 30, and the first fork 1 further advances a programmed distance B. The distance B is set so that the tread 30 is not moved by pushing when the first fork 1 is inserted, that is, the distance is less than one-third the total width of the tread 30.

Then, the clamp 10 holds the end of the tread 30.

Step 3: The second fork 2 advances until its tip reaches the tread end. The distance of advance is determined from the tread width inputted beforehand and distance C calculated from distance B, which is the distance through which the first fork 1 is inserted.

At this position, the tread 30 is raised by lifting the head plate 19. When the second fork 2 advances, the first fork 1 oscillates in accordance with the movement of the tread 30.

Step 3': This step shows the condition where the tread width with respect to the length of the second fork 2 is maximum. This view indicates that the length of the first fork 1 is determined from the maximum insertion length B', and the length of the fork 2 is determined from the shortest length M for the bars 3 and 4 not in contact with each other.

Step 4: The head plate 19 is withdrawn, and the tread 30 is lowered onto the carry-out conveyor 32.

Step 5: The clamp 10 of the first fork 1 is released, and the first fork 1 is withdrawn until the sensor 9 clears the tread end. At this time, the fist fork 1 oscillates, and its tip lowers, but it is regulated by the stopper 7.

Step 6: The head plate 19 is lowered until the tread 30 is completely placed on the carry-out conveyor 32.

Then, the tread 30 is carried out by moving the carry-out conveyor 32.

For the tread 30 placed at the middle or the far position on the plate 31a of the truck, the above operations of Steps 1 to 6 are repeated after the head plate 19 is further advanced.

The tread pickup device of the present invention comprises a plurality of short first forks for scooping up the front edge of a tread placed on the truck and holding the tread, long second forks which are arranged adjacent to the first forks and inserted throughout the total width of the tread, and a mechanism for raising and moving the first and second forks together with the tread.

Therefore, the device has the following effects:

According to the tread pickup device of the present invention, the front edge of the tread is stripped off the plate of the truck without the movement of tread caused by pushing because the first forks are inserted under the front edge of the tread sticking firmly to the plate of the truck and then the front edge is pulled up while being held.

Further, the tread is stripped off the plate of the truck throughout its total width without the movement of tread caused by pushing because the second fork is inserted throughout the total width of the tread while the front edge of the tread being held by the first fork.

Still further, the tread can be automatically picked up by lifting the first and the second forks.

We claim:

1. A tread pickup apparatus for removing a tread slab from a supporting surface, the apparatus comprising:
   a plurality of pairs of prong members arranged substantially in a linear array and spaced from each other, each pair comprising a first prong and a second prong laterally adjacent each other, the first and second prong members suitable for insertion beneath a leading edge of a tread slab, a clamping arm member disposed in opposing relation to the first prong for gripping a tread slab between the clamping arm member and the first prong, the second prong being substantially longer than the first prong;
   moving means for advancing and withdrawing as a group the first prong members and as a group the second prong members with respect to a leading edge of a tread slab, and for moving the first and second prong members vertically with respect to a tread slab, said moving means operable for advancing the group of first prong members under a leading edge of the tread slab whereby the leading edge of the tread slab is grasped between the clamping arm member and the first prong member of each pair, and said moving means operable for advancing the group of second prong members beneath the tread slab across the entire depth of the tread slab for stripping off the tread slab from the supporting surface.

2. The apparatus of claim 1, wherein the moving means is operable to lift the tread slab off the supporting surface by raising the first and second prong members vertically with respect to the tread slab.

3. The apparatus of claim 2, wherein the moving means is operable to lower the tread slab onto a conveyor, and the clamping arm member in each pair of prong members is released thereby placing the tread slab onto the conveyor.

4. The apparatus of claim 1, wherein a sensor is provided on one of said first prong members to detect the leading edge of the tread slab.

5. The apparatus of claim 1, wherein the moving means comprises a first support bar rigidly connected to each of the first prong members and a second support bar rigidly connected to each of the second prong members, a first motor mechanism for advancing and withdrawing the first support bar, a second motor mechanism for advancing and withdrawing the second support bar.

6. The apparatus of claim 5, wherein the moving means further comprises first and second threaded bars, the first and second motor mechanisms for moving the first and second support bars along said first and second threaded bars, respectively, a head plate to which the first and second threaded bars are attached, a head arm to which the head plate is secured, a third motor mechanism for advancing and withdrawing the head plate, and a fourth motor mechanism for vertically moving the head plate.

7. The apparatus of claim 1, wherein the second prong member is at least as long as a depth of the tread slab.

* * * * *